(12) United States Patent
Sugawara et al.

(10) Patent No.: US 7,088,035 B2
(45) Date of Patent: *Aug. 8, 2006

(54) GLASS BULB FOR A CATHODE RAY TUBE AND A METHOD FOR PRODUCING THE SAME

(75) Inventors: Tsunehiko Sugawara, Funabashi (JP); Mikio Ueki, Funabashi (JP)

(73) Assignee: Asahi Glass Company, Limited, Tokyo (JP)

( * ) Notice: Subject to any disclaimer, the term of this patent is extended or adjusted under 35 U.S.C. 154(b) by 348 days.

This patent is subject to a terminal disclaimer.

(21) Appl. No.: 10/193,230

(22) Filed: Jul. 12, 2002

(65) Prior Publication Data

US 2003/0155854 A1   Aug. 21, 2003

Related U.S. Application Data

(63) Continuation of application No. PCT/JP02/05796, filed on Jun. 11, 2002.

(30) Foreign Application Priority Data

Jan. 22, 2002   (JP)   ............................ 2002-013025

(51) Int. Cl.
  *H01J 29/86*   (2006.01)
  *H01J 5/24*    (2006.01)
  *H01J 9/26*    (2006.01)

(52) U.S. Cl. ............... 313/480; 313/477 R; 220/2.1 A; 220/2.3 A

(58) Field of Classification Search ............... 313/480, 313/477 R; 220/2.1, 2.3; 445/24, 25; 348/821; 65/30.13

See application file for complete search history.

(56) References Cited

U.S. PATENT DOCUMENTS

| 5,445,285 A | * | 8/1995 | Sugawara et al. | ....... 220/2.1 A |
| 6,597,102 B1 | * | 7/2003 | Sugawara et al. | ...... 313/477 R |
| 6,844,669 B1 | * | 1/2005 | Sugawara et al. | .......... 313/480 |
| 2002/0109454 A1 | * | 8/2002 | Komori | ...................... 313/480 |

FOREIGN PATENT DOCUMENTS

| JP | 51-71314 | 6/1976 |
| JP | 2000-348643 | 12/2000 |
| JP | 2001-294442 | 10/2001 |
| JP | 2001-302278 | 10/2001 |
| JP | 2001-348245 | 12/2001 |

(Continued)

*Primary Examiner*—Nimeshkumar D. Patel
*Assistant Examiner*—Matt Hodges
(74) *Attorney, Agent, or Firm*—Oblon, Spivak, McClelland, Maier & Neustadt, P.C.

(57) ABSTRACT

The present invention is to obtain a glass bulb of reduced weight, and high safeness and reliability by ion exchanging which assures a compressive stress layer having an effective thickness even to a large tensile vacuum stress. For this purpose, a region in an outer surface of a body portion 4 of the glass funnel, the region having a small mechanical strength and producing the maximum tensile vacuum stress thereby causing breakage easily, is partly strengthened by ion exchanging method according to an electric field assisting method and an ion exchanging method using paste in combination, whereby a portion 9 strengthened by ion exchanging method is provided in that region wherein the concentration of doped ions in a strengthened compressive stress layer is distributed according to a substantially step function in a direction from the surface of the glass toward the inside of it.

11 Claims, 5 Drawing Sheets

FOREIGN PATENT DOCUMENTS

| | | |
|---|---|---|
| JP | 2001-348248 | 12/2001 |
| JP | 2002-60242 | 2/2002 |
| WO | WO 99/48824 | 9/1999 |
| WO | WO 01/40128 A1 | 6/2001 |

* cited by examiner

GLASS BULB FOR A CATHODE RAY TUBE AND A METHOD FOR PRODUCING THE SAME

CROSS REFERENCE TO RELATED APPLICATION

This is a Continuation Application of PCT application Ser. No. PCT/JP02/05796, filed on Jun. 11, 2002, which was not published under PCT Article 21(2) in English. This application is based upon and claims the benefit of priority from the prior Japanese Patent Application No. 2002-013025, filed Jan. 22, 2002, the entire contents of which are incorporated herein by reference.

TECHNICAL FIELD

The present invention relates to a cathode ray tube used mainly for receiving television broadcast, a glass bulb for a cathode ray tube and a method for producing the same.

BACKGROUND ART

As shown in FIG. 7, a cathode ray tube 1 used for receiving television broadcast has an envelope which is basically formed by bonding a panel portion 3 for displaying an image and a substantially funnel-shaped funnel portion 2 which comprises a neck portion 5 housing an electron gun 11, a yoke portion 6 for mounting a deflection coil and a body portion 4, along a sealing portion 10. The panel portion 3 comprises a face portion 7 for displaying an image and a skirt portion 8 to be joined with the funnel portion 2. The panel portion 3 and the funnel portion 2 constitute a glass bulb.

In FIG. 7, numeral 12 designates a phosphor layer which emits fluorescence upon irradiation with an electron beam, 14 designates a shadow mask which determines the positions of the phosphors to be irradiated with an electron beam, and 13 designates a stud pin to fix the shadow mask 14 to the inside of the skirt portion 8. A character A designates the tube axis connecting the central axis of the neck portion 5 to the center of the panel portion 3. The face portion of the panel portion provides a substantially rectangular shape which is formed by 4 sides substantially parallel with the long and short axes which intersect the tube axis A at right angles.

The cathode ray tube utilizes such a principle of operation that thermoelectrons are emitted in a high vacuum from the cathode provided in the electron gun; the thermoelectrons are converged into an electron beam; it is accelerated by the application of a high voltage of from about 25 kV to 35 kV between the cathode and the anode; the accelerated electron beam is bombarded to the phosphors to excite them whereby an image is displayed.

On the other hand, the inside of the cathode ray tube is maintained in a high vacuum state. Accordingly, the difference between internal and external pressures of the glass bulb having an asymmetric structure unlike a spherical shell, acts as an external force to produce a vacuum stress whereby a large tensile stress, i.e., a tensile vacuum stress is generated in the circumference of the face portion, an outer surface of the skirt portion of the panel portion, and in an outer surface of the body portion of the funnel portion.

FIG. 8 shows, as an example, a distribution of stress generated along the short and long axes of the glass bulb wherein the solid line represents a vacuum stress generated in a direction along the paper surface; the broken line represents a vacuum stress generated in a direction perpendicular to the paper surface, and figures along the distribution of stress indicate stress values at the respective positions. As understood from FIG. 8, the tensile vacuum stress is generally large on the short axis, it shows the maximum value at an edge of the face portion in the panel portion, and it shows a larger value in the funnel portion in a portion approaching the opened end of the body portion. The tensile vacuum stress will increase as the thickness of the glass is thinner. Accordingly, there is a high possibility of causing a mechanical fracture in a glass bulb having a thin wall thickness and light weight when a flaw is generated in a region in which the maximum stress exists.

In the glass bulb for a cathode ray tube in such state, if a crack is generated, the crack spreads rapidly to release a high internal deformation energy in it to cause the fracture of the glass bulb for a cathode ray tube. Further, in a state that there is a high tensile stress in the outer surface, a delayed fracture takes place due to the atmospheric moisture to thereby decrease reliability. Accordingly, there has been known that on the premise that the cathode ray tube suffers a flaw, the breaking strength of a glass bulb when it suffers a flaw with a #150 emery sheet, is used as the practical strength of the glass bulb. In a case of glass used for an unstrengthened funnel portion, the practical strength is merely about 24 MPa. Conventionally, in consideration of such practical strength, the maximum tensile vacuum stress $\sigma_{VF}$ admissible to the funnel portion has been at most about 10 MPa.

As simple measures to assure the mechanical strength of the glass bulb without strengthening, there has been used a technique that the thickness of the glass bulb is made sufficiently large. As a result, for example, the mass of the glass funnel having a deflection angle of electron beam of 110° and a screen size of 86 cm reaches about 15.5 kg.

On the other hand, a large number of image displaying devices other than the cathode ray tube have been put to practical use in recent years. In comparison of them with the cathode ray tube, the depth and weight have been taken up as big disadvantages of the display device. Accordingly, there is a strong demand to reduce the depth and weight. However, the reduction in the depth of a conventional cathode ray tube makes its structure more asymmetrical to cause a problem that a large tensile vacuum stress which exceeds extremely the breaking strength of the glass is generated in the glass bulb.

In an attempt to make the wall thickness of glass thinner to reduce the weight, the rigidity of the glass is generally reduced to thereby cause an increase of deformation energy. Since the increase of deformation energy will in particular increase the tensile stress, decline in reliability due to decline of safetiness by fracture or a delayed fracture is aggravating. When the wall thickness of the glass is increased, an increase of the stress can be prevented while controlling the deformation energy. However, the weight is inevitably increased as described above.

As a way to reduce the weight of a glass bulb for a cathode ray tube, there has conventionally been practical to form a compressive stress layer in the surface of the glass panel (the panel portion) in about ⅙ as large as the thickness of the glass by using a thermal tempering method as disclosed in U.S. Pat. No. 2,904,067.

However, in a case of the glass funnel (funnel portion), a glass funnel for a cathode ray tube having for instance, a diagonal conjugate diameter of screen of 86 cm and a deflection angle of 110°, the thickness of the glass at the sealing portion with respect to the glass panel exceeds 13 mm as the maximum, while the thickness of the glass at the sealing portion with respect to the neck portion is less than 3 mm as the minimum. Namely, since the maximum wall thickness is more than 4 times as the minimum wall thickness, it is impossible to uniformly quench the glass funnel having an uneven wall thickness distribution. As a result, the strengthening of the glass funnel by a thermal tempering method has not been put to practical use because a large residual tensile stress develops in the surface concurrently with the compressive stress due to an uneven temperature distribution in the surface.

On the other hand, there has been known to reduce the weight by strengthening the surface of the glass bulb by an ion exchanging method. This method is a method to replace specified alkali ions in the glass with larger ions at a temperature lower than an annealing temperature range to thereby form a compressive stress layer in the surface because of the volume increase. The ion exchanging method utilizing thermal diffusion is advantageous in reducing the weight in comparison with the thermal tempering in the points that a relatively large compressive stress can be obtained and an undesired tensile stress is not generated.

Generally, the composition of the glass usable for a glass funnel contains at least 60 mol % of $SiO_2$, as the major component of glass, and from about 7 to 8.5 mol % of PbO in order to increase the X-ray absorptive power. In addition, it contains an oxide of alkali metal such as sodium and potassium in consideration of the necessity of matching the thermal expansion coefficient with that of another material or the necessity of maintaining an appropriate viscosity at a high temperature while the melting ability and moldability of the glass is taken into account.

On the other hand, the glass is required to have a high electric resistance so as to withstand to a high voltage in operation and so as not to cause the dielectric breakdown of the cathode ray tube. For this, two components of sodium and potassium are well balanced, and a high electric resistance is realized due to a mixed alkali effect. For example, as the glass composition usable generally for a glass funnel, a $SiO_2$—$Al_2O_3$—PbO—$R_2O$—R'O type ($R_2O$: an alkali metal oxide and R'O: an alkali earth oxide) is adopted. In order to increase the electric resistance, attention should be paid to the content of alkali having a relatively small ionic radius, such as lithium ions, sodium ions, potassium ions or the like which has a high ionic mobility. Usually, it is unnecessary to contain a lithium oxide in the composition of the glass funnel, and a sodium oxide and a potassium oxide are contained in an amount of from about 5 to 9% by molar percentage.

In case of using an ion exchanging method in which sodium ions are replaced with potassium ions by thermal diffusion, for the above-mentioned glass, the thickness of the compressive stress layer is from 30 μm to 40 μm at the most because the quantities of the sodium oxide and the potassium oxide are already well balanced, and therefore, the mobility of potassium ions is low, and even though it is immersed for 24 hours in a molten liquid of $KNO_3$ of about 450° C. Further, although the compressive stress value has a value of about 80 MPa in the surface, the compressive stress value attenuates exponentially in a thickness direction of the glass, i.e., from the surface of the glass to the inside of it. The depth of a flaw generated in a cathode ray tube, which may suffer during the manufacturing or in a market is about the same as the compressive stress layer. Accordingly, when the compressive stress layer is too thin, there is no effect against a flaw exceeding the thickness of the compressive stress layer. Further, in a state of the cathode ray tube with which a vacuum stress is loaded, the above-mentioned tensile vacuum stress and a strengthened compressive stress are applied together, whereby the effective thickness of the compressive stress layer decreases remarkably, and reliability decreases.

Other than the ion exchange method using thermal diffusion, there has been known ion exchanging using an electric field assisted ion exchanging method (hereinbelow, referred to as the electric field assisting method). JP-A-2001-302278 describes generally such ion exchange method. Namely, a molten liquid of potassium nitrate, a molten liquid of sodium nitrate or a molten liquid obtained by mixing them is prepared; the glass is dipped in the molten liquid; an anode is provided at a surface side of the glass to be subjected to the ion exchanging and a cathode is provided at the opposite surface dipped, and a d.c. voltage is applied to conduct ion exchanging at temperature below the strain point.

The feature of this method is to apply an electric field to increase the mobility of doped ions having a relatively larger ionic radius to replace them with ions having a relatively smaller ionic radius in the glass, whereby a sufficient compressive stress value and a sufficient compressive stress layer depth (thickness) are formed in a short time. However, a funnel-shaped three-dimensional structure having a large volume such as a glass funnel has difficulty in applying uniformly an electric field in an immersed state; a problem during the manufacturing such as a leak current and so on, and a problem concerning characteristics such as warp caused when an outer surface i.e., only a single surface of the glass funnel is strengthened. Accordingly, an effective method for the ion exchanging method of the glass funnel has not been proposed.

It is an object of the present invention to eliminate the disadvantages of conventional techniques to, in particular, reduce the weight of a glass funnel for a flat cathode ray tube. Namely, when a glass funnel having a glass composition in which the contents of a sodium oxide and a potassium oxide are almost balanced is strengthened by ion exchanging method by the conventional ion exchanging method using thermal diffusion, the magnitude of the compressive stress in the compressive stress layer formed by the above-mentioned ion exchanging method attenuates according to an exponential function from its surface to the inside of it even after the dipping for about 24 hours, and the compressive stress becomes zero at about 40 μm at the most.

Further, in a cathode ray tube having a load of vacuum stress, there is a disadvantage that the effective thickness of the compressive stress layer is decreased remarkably in a region where the above-mentioned maximum tensile vacuum stress is generated to thereby decrease reliability. Therefore, there is a strong demand of accomplishment of an ion exchange method which can assure sufficiently the thickness of a compressive stress layer in a relatively short time; does not cause a rapid attenuation of stress in its depth direction, and is suitable for glass for a cathode ray tube having a composition in which an alkali oxide is well balanced.

Further, in an attempt of reducing the weight of a glass funnel or a glass bulb by ion exchanging, it was uncertain as to the limit to the weight reduction in consideration of a stress value, a thickness and a stress distribution of the formed compressive stress layer. Namely, there is a strong demand of accomplishment of a glass funnel of highly reliable and light weight by specifying the relation of the tensile vacuum stress determined by the shape and wall thickness of the glass funnel in consideration of a flaw or the like in a loading state of a vacuum stress after the assembling of a cathode ray tube and a strengthening characteristics obtained by the ion exchanging method.

Further, as disclosed in, for example, JP-B-40-28674, there has been known a method that a salt containing alkali ions used for ion exchange, clay and water are mixed to make paste, and the paste is applied to glass followed by heating it to the temperature at which the salt is molten during which ion exchange is conducted (hereinbelow, referred to as an ion exchanging method using paste). This method is suitable for strengthening partly a limited region of a glass article (hereinbelow, it may be referred to as the partly strengthening) because only the portion coated with the paste can be strengthened by ion exchanging method.

In the conventional ion exchanging method using paste, water is used as a solvent for making the paste because the salt containing alkali ions used for ion exchange is in most cases water-soluble. Accordingly, when the paste is applied to a non-flat glass such as a glass funnel, the salt containing water expands from the portion where the paste is applied. Therefore, the ion exchanging is conducted to a region which is broader than the portion where the paste is actually applied.

Further, the expansion of the water depends on the thickness of the paste, moisture and the surface roughness of the glass, and accordingly, it is difficult to define actually the surface area to be strengthened by ion exchanging method. On the other hand, there has been known the fact that in ion exchanging using the electric field assisting method, the depth of a layer strengthened by ion exchanging method depends on a quantity of electricity per unit surface area. Accordingly, when the surface area to be strengthened by ion exchanging method is not fixed, there causes scattering in the depth of the layer strengthened by ion exchanging method even though the same quantity of electricity is supplied. For ion exchanging partly a limited region of a glass article while the depth and the compressive stress value of the layer strengthened by ion exchanging method are controlled appropriately, a solvent which does not expand after the application is required strongly.

DISCLOSURE OF THE INVENTION

The present invention has been achieved in view of the above-mentioned problems and object, and to provide a glass bulb capable of assuring reliability sufficient to withstand the difference between inner and outer pressures to the cathode ray tube, wherein the degree of weight reduction of the glass funnel subjected to an ion exchanging method is determined in conjunction with the magnitude of the maximum tensile vacuum stress which is generated by the difference between inner and outer pressures of the cathode ray tube and which is determined by the structure and wall thickness of the glass bulb, and a compressive stress obtained by the ion exchanging and the thickness of the stress layer in a region where the maximum tensile vacuum stress is generated, and a cathode ray tube using such glass bulb.

Further, the present invention is to provide an ion exchanging method which is suitable for a glass funnel having a glass composition which is so designed as to balance an alkali oxide to obtain a mixed alkali effect and which is a combination of an ion exchanging method using paste for strengthening partly a selected region and an electric field assisting method.

According to the present invention, there is provided a glass bulb for a cathode ray tube comprising a panel portion having a substantially rectangular face portion and a funnel portion including a body portion having an opened end connected to the panel portion, the glass bulb being characterized in that:

glass constituting the funnel portion contains at least 60% of $SiO_2$ and at least 7% of PbO by molar percentage and satisfies $0.35 \leq WK/(WNa+WK) \leq 0.6$ where WNa and WK indicate respectively a molar percentage of $Na_2O$ and $K_2O$ included therein;

that the glass bulb, when assembled in a cathode ray tube, has a region which generates a tensile vacuum stress by the application of an atmospheric pressure to an outer surface of the glass bulb inside of which is vacuumed, and a compressive stress layer is formed partly by ion exchanging in an at least a region in the funnel portion, which includes a portion in an outer surface of the body portion of the funnel portion, in which $\sigma_{VF}$ is generated, where $\sigma_{VF}$ is the maximum value of the tensile vacuum stress, and that the concentration of potassium ions is distributed according to a substantially step function in a thickness direction of the glass in the compressive stress layer, and when the maximum value of a compressive stress in the compressive stress layer is $\sigma$ cm, the relation between $\sigma_{cm}$ and $\sigma_{VF}$ is $0.03 \leq |\sigma_{VF}/\sigma_{cm}| \leq 0.5$.

Further, according to the present invention, there is provided a method for producing a glass bulb for a cathode ray tube, which includes an ion exchanging method for a glass bulb comprising a panel portion having a substantially rectangular face portion and a funnel portion with a body portion having an opened end connected to the panel portion, the method being characterized by:

forming an anode with a paste including a salt containing alkali ions whose ionic radius is larger than or equal to that of alkali ions in the glass, in a region including a portion providing $\sigma_{VF}$ in an outer surface of the body portion of the funnel portion, wherein the glass bulb, when assembled in a cathode ray tube, has a region which generates a tensile vacuum stress by the application of an atmospheric pressure to an outer surface of the glass bulb inside of which is vacuumed, and the $\sigma_{VF}$ represents the maximum value of the tensile vacuum stress in the funnel portion, and applying a voltage across the anode and a cathode provided on an inner side of the body portion at a high temperature to replace the alkali ions in the glass with alkali ions in the anode, whereby the outer surface of the body portion attached with the anode is partly strengthened by ion exchanging method.

Further, according to the present invention, there is provided a cathode ray tube prepared by using the above-mentioned glass bulb for a cathode ray tube, or the glass bulb for a cathode ray tube prepared by the above-mentioned manufacturing method.

In preferred embodiments of the glass bulb for a cathode ray tube, the method for producing a glass bulb for a cathode ray tube or a cathode ray tube according to the present invention, there are the following characteristic features.

1) The glass bulb for a cathode ray tube wherein $\sigma_{VF}$ is 10 to 40 MPa and $\sigma_{cm}$ is 80 to 350 MPa.
2) The glass bulb for a cathode ray tube wherein $\sigma_{cm}$ is generated in the surface or inside of the compressive stress layer in a direction of the thickness of the glass, and $t_1$ is in a range of from 60 to 200 um where $t_1$ represents a depth which is inside of the portion generating $\sigma_{cm}$ and at which the magnitude of the compressive stress is equal to $\sigma_{VF}$.
3) The glass bulb for a cathode ray tube wherein the tensile vacuum stress generated in an outer surface of the body portion at the side adjacent to a side where $\sigma_{VF}$ is generated, is 10 MPa or less.

4) The glass bulb for a cathode ray tube wherein the region in which the compressive stress layer is partly formed by ion exchanging is in an outer surface of the body portion at a side where $\sigma_{VF}$ is generated, and which has a tensile vacuum stress of at least 10 MPa.

5) The glass bulb for a cathode ray tube wherein a region generating a tensile vacuum stress of at least 10 MPa is formed in an outer surface of the body portion at the side adjacent to a side where $\sigma_{VF}$ is generated, and the outer surface of the body portion including at least that region is partly strengthened by ion exchanging method.

6) The glass bulb for a cathode ray tube wherein the deflection angle of electron beam is substantially 120° or more.

7) The method for producing a glass bulb for a cathode ray tube wherein the paste is obtained by adding, to the salt containing alkali ions whose ionic radius is larger than or equal to that of alkali ions in the glass, clay such as kaolin containing silicon dioxide as the main component and an organic solvent which disappears by decomposition or evaporates at a lower temperature than the melting point of the salt, and mixing them.

8) The method for producing a glass bulb for a cathode ray tube wherein the anode and the cathode are formed by coating the paste, or fitting an electrode material previously applied with the paste, respectively on outer and inner surfaces of the body portion.

9) The method for producing a glass bulb for a cathode ray tube wherein the cathode is provided as a common electrode in a single form on an inner side of the body portion or provided as a sole electrode in a separate form so as to correspond to the anode respectively.

10) The method for producing a glass bulb for a cathode ray tube wherein the cathode is formed with substantially the same paste as the anode.

11) The method for producing a glass bulb for a cathode ray tube wherein a voltage is applied in a range of $5 \leq (V/\mathrm{Log}_e \rho)/T \leq 15$ where V is a voltage (V) applied across the anode and the cathode through glass, $\rho$ is a specific resistance ($\Omega$ cm) at a strain point in the glass and T is the minimum thickness (mm) of the glass in a region strengthened by ion exchanging method.

12) A cathode ray tube using a physically strengthened glass panel as a panel portion.

BEST MODE FOR CARRYING OUT THE INVENTION

The present invention is to provide a flat glass bulb, in particular, a glass funnel wherein the glass funnel is partly strengthened so that the concentration of doped potassium ions indicates a distribution according to a substantially step function in its depth direction (a thickness direction of the glass), the relation between the magnitude of the maximum tensile vacuum stress and the magnitude of a strengthened compressive stress which are determined by the structure and the wall thickness of the glass bulb having the partly strengthened glass funnel is specified, and the thickness of a compressive stress layer strengthened by ion exchanging method and a partly strengthened region are specified. With such features, reliability can be assured, and weight reduction can effectively be obtained.

Further, according to the present invention, a method for ion exchanging a region having a high tensile vacuum stress partly, by using an electric field assisting method and an ion exchanging method using paste in combination, in the glass funnel having a glass composition in which an alkali oxide for obtaining a mixed alkali effect is well-balanced to increase the electric resistance, is presented concretely.

FIG. 1 is a perspective view of the glass funnel as a preferred embodiment of the present invention. The configuration of the glass funnel is substantially the same as a conventional one, and it comprises a neck portion 5, a yoke portion 6 for mounting a deflection coil and a body portion 4 which has a substantially rectangular opened end 15 at its end portion. Accordingly, the body portion 4 is flared in a funnel-like shape from the yoke portion 6 toward the opened end 15 in an intermediate portion between the yoke portion 6 and the opened end 15 so as to provide a rectangular shape in cross section as approaching the opened end 15.

In a cathode ray tube prepared by using such glass funnel, the maximum tensile vacuum stress is often generated in a portion in the vicinity of the opened end 15 on the short axis of an outer surface of the body portion along its long side, i.e., a portion near the opened end 15 in the central portion of the outer surface of the body portion along its long side. Due to the maximum tensile vacuum stress, that portion is the mechanically weakest portion to an external force or a flaw. Accordingly, the present invention is to mechanically strengthen at least the portion of the outer surface along each long side of the body portion 4 in the glass funnel so that a compressive stress having a predetermined value or higher is distributed according to a generally step function from the surface to a deep area. Numeral 9 in FIG. 1 shows a strengthened portion by ion exchanging method.

In the following, the present invention will be described in detail.

In the present invention, a $SiO_2$—$Al_2O_3$—$PbO$—$R_2O$—$R'O$ type ($R_2O$: an alkali metal oxide and $R'O$: an alkali earth oxide) glass is used for the glass of the body portion of the glass funnel. The glass of this type is known as for the glass funnel, which contains at least 60 mol % of $SiO_2$ and at least 7 mol % of PbO in order to obtain electric characteristics and an X-ray shielding effect. In order to realize a mixed alkali effect and a predetermined ion exchanging in such glass composition, the content of $K_2O$ based on the sum of the content of $Na_2O$ and $K_2O$ as represented by weight percentage is determined as follows.

Namely, when the molar percentages of $Na_2O$ and $K_2O$ are represented respectively by WNa and WK, the content of $K_2O$ should satisfy $0.35 \leq WK/(WNa+WK) \leq 0.6$. When WK/(WNa+WK) is in a range of from 0.35 to 0.6, a high electric resistance is obtainable and it is suited for ion exchanging. Further, even in a composition added with lithium to facilitate ion exchanging, the content exceeding 2% by molar percentage is not realistic from the viewpoint of matching to the thermally expansion coefficient and economical efficiency. Even in a composition containing not more than 2% of lithium, if the proportion of the content of a potassium oxide based on the sum of the content of a lithium oxide, a sodium oxide and the potassium oxide is in a range of from 0.35 to 0.6, the mixed alkali effect can be realized and a high electric resistance is obtainable.

The difference between inner and outer pressures acting on the cathode ray tube is uniform in its plane. Accordingly, a region having a tensile vacuum stress in the glass funnel changes gradually from a location where the maximum tensile vacuum stress $\sigma_{VF}$ is generated to a neutral point where the tensile vacuum stress changes to a compressive vacuum stress, and it occupies a non-negligible surface area in the glass funnel surface.

In a glass bulb having dimensional specifications wherein the maximum tensile vacuum stress $\sigma_{VF}$ is 10 MPa or less, there is obtainable an advantage that a region requiring strengthening is smaller, however, it is difficult to achieve a sufficient weight reduction. On the other hand, in the dimensional specifications wherein $\sigma_{VF}$ exceeds 40 MPa, a sufficient weight reduction is obtainable, however, a region having a tensile vacuum stress is larger, and a tensile vacuum stress generated near the sealing portion to the glass panel is increased. Accordingly, it is difficult to control the vacuum stress in this portion to be lower than the strength of a sealing material, which is lower than the strength of a material for the glass funnel. Such glass funnel can not provide a sufficient strength of the sealing portion even though the strength of the glass funnel itself can be partly strengthened by ion exchanging method. Accordingly, the advantage of strengthening the glass funnel partly is lost.

Further, in order to maximize the advantage of ion exchanging, it is preferable to use such dimensional specifications that only either one between opposing short side portions and long side portions which constitute the body portion of the glass funnel is strengthened partly. Namely, it is preferable to form the glass funnel so that the tensile vacuum stress in a side portion which does not have the maximum tensile vacuum stress $\sigma_{VF}$ is 10 MPa or less because it is unnecessary to strengthen such region.

In ion exchanging glass wherein doped alkali ions and replaced alkali ions are balanced, such as the glass composition of a glass bulb for a cathode ray tube, comparison was made between an ion exchange method using thermal diffusion (hereinbelow, referred to as the thermal diffusion method) and an electric field assisting method. As shown in FIG. 2, the distribution of the concentration of alkali ions doped into the glass and the depth are completely different. In the thermal diffusion method, an increase of the doped alkali ion concentration attenuates exponentially from its surface, and it balances with the concentration of the glass composition itself at a relatively shallow point from the surface.

On the other hand, in the electric field assisting method, the mobility of ions is increased from an anode side toward a cathode side by the aid of an electric field, whereby ions can be doped easier. Accordingly, a relatively large increase of the concentration can be obtained up to a deeper portion from the surface. In a further deeper portion, the doped alkali ion concentration attenuates rapidly with a nearly vertical distribution. There is a slight difference in the distribution depending on conditions for ion exchanging. However, the distribution is basically the same because it is typical in the electric field assisting method. In the present invention, the distribution of the concentration of doped alkali ions according to a substantially step functional means a different pattern of distribution according to an exponential function in the thermal diffusion method. The concentration of doped alkali ions is measured by, for example, cutting vertically a portion strengthened by ion exchanging method of glass from its surface, forming a sample by processing the cut face to be a mirror finished surface, and scanning the sample with an X-ray micro-analyzer from its surface toward the inside of the glass.

In either ion exchange method, the thickness $t_c$ (μm: the same hereinafter) of the compressive stress layer formed in the glass agrees with the depth at a point where the concentration of alkali ions such as potassium ions doped from the glass surface balances substantially with the concentration of the glass composition itself. The distribution of stress in the compressive stress layer obtained by ion exchanging is in proportion to the doped alkali ion concentration. Accordingly, when the distribution of the concentration of the doped alkali ions is according to a substantially step function, the distribution of stress in the compressive stress layer shows also a substantially step functional distribution. Accordingly, in the compressive stress layer obtained by the electric field assisting method, the compressive stress distributes from the surface toward the inside of the glass without substantial attenuation in comparison with the compressive stress layer obtained by the thermal diffusion method, and the thickness of the compressive stress layer is larger. Further, the electric field assisting method is advantageous in that a time for injecting ions is shorter.

In a case of using the electric field assisting method to conduct ion exchange at a relatively low temperature region which is, for example, about 20° C. lower than the strain point, the compressive stress value in the compressive stress layer gradually decreases from the maximum value $\sigma_{cm}$ in a portion in the vicinity of the surface to attenuate to zero at a point having a depth $t_c$ as shown in FIG. 2. Further, the distribution of the strengthened stress from the surface to $t_c$ is in proportion to a change of the before-mentioned doped alkali ion concentration. Accordingly, even when a tensile vacuum stress is superimposed, a remarkable reduction of the effective thickness of the compressive stress layer is avoidable unlike in the case of thermal diffusion method because of its having the strengthened stress distribution according to a substantially step functional.

Further, when the treating temperature is made lower in the electric field assisting method, stress relaxation is inhibited, and a higher compressive stress value is obtained. However, if the strengthened compressive stress $\sigma_{cm}$ exceeds 350 MPa, an excessive tensile stress layer is formed in an inner portion adjacent to the compressive stress layer. Namely, when a mechanical impact is given, a crack initiated in a portion other than the strengthened region expands to the strengthened region, and when the crack penetrates the tensile stress layer, an accumulated tensile energy is released to cause an instantaneously fracture to thereby invite a severe implosion shrinkage because of a vacuum action in the cathode ray tube.

When ion exchanging is conducted by the electric field assisting method at or in the vicinity of the strain point of the glass, or at a relatively high temperature which is about 20° C. higher than the strain point, there causes stress relaxation near the surface during the ion exchanging treatment by the electric field assisting method whereby the strengthened stress is decreased, as shown in FIG. 3. As a result, the distribution of the strengthened compressive stress is not in proportion to the distribution of doped alkali ion concentration to the depth where the stress relaxation takes place. However, such stress relaxation can be controlled within a relatively shallow range unless temperature is too high or the treating time is too long, and it is possible to maintain the maximum compressive stress $\sigma_{cm}$ in any point in the distance between the surface to the depth $t_c$. The stress relaxation caused near the surface is no problematic if it is slight. In a region deeper than the depth $t_m$ where the maximum compressive stress $\sigma_{cm}$ takes place, a proportional relation between the distribution of doped alkali ion concentration and the distribution of strengthened stress can substantially be kept.

When ion exchanging is conducted at a temperature region further higher than the above-mentioned temperature, the stress relaxation is increased so that the maximum compressive stress $\sigma_{cm}$ is decreased to 80 MPa or lower, and the above-mentioned proportional relation is lost, and it is undesired. Accordingly, the temperature region for the treatment is preferably −50° C.≦strain point of glass≦10° C., more preferably, −30° C.≦strain point of glass≦0° C.

From the above, it is preferable that the relation between $\sigma_{VF}$ and $\sigma_{cm}$ is in a range of $0.03 \leq |\sigma_{VF}/\sigma_{cm}| \leq 0.5$. Namely, when $|\sigma_{VF}/\sigma_{cm}|$ is 0.03 or less, $\sigma_{cm}$ exceeding 350 MPa is required as described above, and accordingly, the breaking characteristic becomes deteriorated and a safety level is decreased. Further, when $|\sigma_{VF}/\sigma_{cm}|$ exceeds 0.5, the proportion of $\sigma_{cm}$ to the maximum tensile vacuum stress $\sigma_{VF}$ becomes smaller whereby it is difficult to obtain a desired safety level required for a cathode ray tube.

In the present invention, $\sigma_{VF}$ and $\sigma_{cm}$ can be determined mainly depending on a design specification and conditions for ion exchanging to the glass funnel respectively. However, in order to satisfy the above-mentioned conditions while the requirement of reducing the weight of the glass funnel and efficiency for ion exchanging can be achieved, $\sigma_{VF}$ is preferably in a range of from 10 to 40 MPa by the above-mentioned reason.

The delayed fracture of glass is caused by a stress corrosion phenomenon affected by moisture existing at the surface. It has been known that even when there is a flaw in the glass surface, which may be a source for causing fracture, the crack does not develop and the delayed fracture does not occur if the glass is in a compressive stress state. When such knowledge is applied to a cathode ray tube using the glass funnel strengthened by ion exchanging method, the delayed fracture does not occur if a region having the maximum tensile vacuum stress $\sigma_{VF}$ is in a compressive stress state. In order to obtain a cathode ray tube of highly reliable and capable of suppressing the delayed fracture, it is necessary to maintain the relation between the strengthened stress and the maximum tensile stress so as to satisfy at least a relation of $|\sigma_{VF}/\sigma_{cm}| < 1.0$. However, the present invention satisfies sufficiently this condition because of $|\sigma_{VF}/\sigma_{cm}| \leq 0.5$.

As described before, since the ion exchanging method using a thermally diffusion method is to form a distribution of stress according to an exponential function in the depth direction, the effective thickness of the compressive stress layer is decreased rapidly when there is a tensile vacuum stress comparable to a strengthened compressive stress. However, since the distribution of stress in the depth direction obtained by the electric field assisting method is according to a substantially step function as described before, the reduction of the thickness itself is substantially negligible even when there is a tensile vacuum stress having a magnitude comparable to a strengthened compressive stress.

Further, the effective thickness of the compressive stress layer can be considered as a depth to a point $t_1$ at which the strengthened compressive stress and the maximum tensile vacuum stress $\sigma_{VF}$ balance, as shown in FIG. 3. It is preferable that $t_1$ is from 60 to 200 μm. In order to maintain the effective thickness of the compressive stress layer against the maximum tensile vacuum stress $\sigma_{VF}$ or a flaw, $t_1$ is required to have 60 μm or more. It has been known that in a usual condition of use, the depth of a flaw given to the surface of a cathode ray tube during operation is 30 μm as much as the depth of a flaw abraded by using a #150 emery sheet, or less. Further, even in a case of applying a flaw with a sharp cutter, it is enough to assume a depth of about 60 μm at the most. Accordingly, when the thickness of the compressive stress layer is smaller than 60 μm, it is difficult to maintain a desired thickness in the application of the maximum tensile vacuum stress, and safetiness to an assumed flaw might not be obtained.

However, when $t_1$ exceeds 200 μm, an ion exchanging time is prolonged, whereby stress relaxation takes place in the surface. Further, a large tensile stress layer is generated in the central portion of glass adjacent to the compressive stress layer as described before, and practicability is lost.

In the determination of the dimensional specifications for the glass funnel, a region having a tensile vacuum stress of 10 MPa or more and having the second peak next to $\sigma_{VF}$ may be generated at a side portion where no maximum tensile vacuum stress $\sigma_{VF}$ is generated, namely, in an outer surface of the body portion at a shorter side adjacent to a longer side when $\sigma_{VF}$ is generated at the longer side, from the viewpoint of weight reduction and moldability of the glass funnel. In such case, it is preferable to conduct ion exchanging to a part of the outer surface of the body portion at the longer side where the maximum tensile vacuum stress $\sigma_{VF}$ is generated, and at the same time, the above-mentioned region at the shorter side is also partly strengthened by ion exchanging method. Namely, the region of the outer surface of the body portion in which a tensile vacuum stress of at least 10 MPa is generated, is appropriately strengthened by ion exchanging method as the case requires.

In such case, since the regions strengthened by ion exchanging of longer and shorter sides would have different strengthened compressive stresses and different thicknesses of strengthened stress layer, it should not take a way that only a pair of electrodes is provided so that a region bridging an adjacent portion is subjected to ion exchanging to form a continuously strengthened region. It is preferable to use a separated electrode structure wherein anodes are provided independently on the outer surface of the body portion at all 4 side portions so as to facilitate control of a voltage and time.

The present invention is effective to a glass funnel for a cathode ray tube or a cathode ray tube having a flat shape wherein the deflection angle of electron beam is large. FIG. 4 shows the relation between the deflection angle and the maximum tensile vacuum stress generated in an edge of the face portion of the glass panel (specifically, a screen edge of the face portion, the same hereinafter) and the body portion of the glass funnel, provided that the diagonal deflection angle of electron beam is increased, of a glass bulb for a cathode ray tube having a screen size of, for instance, a diagonal conjugate diameter of 86 cm and an aspect ratio of 16:9 manufactured by Asahi Glass Company, Limited. In FIG. 4, the solid line indicates the relation at the edge of the face portion of the glass panel, and a dotted line indicates the relation in the body portion of the glass funnel. The deflection angle is determined by an angle of a line connecting the center of the reference line as a virtual reference line to an effective edge of the diagonal axis of an inner plane of the face portion (according to EIAJ ED-2134B, standard of Japan Electronics and Information Technology Industries Association (JEITA)). As is clear from FIG. 4, the maximum tensile vacuum stress generated at the edge of the face portion of the glass panel indicates about 11 MPa when the deflection angle is 110°. As the deflection angle is larger, the maximum tensile vacuum stress gradually decreases but there is no substantial change. Such stress value is such an extent capable of assuring a sufficient strength even in a case of reducing the weight by thermal tempering. Even in an attempt to make the thickness of the glass panel thin extremely by ion exchanging, it is not reasonable because there arise problems of X-ray leaking and the deterioration of implosion characteristics. Accordingly, the glass panel is preferably one having been subjected to thermal tempering.

On the other hand, the maximum tensile vacuum stress $\sigma_{VF}$ of the body portion of the glass funnel increases rapidly from 10 MPa wherein the deflection angle is 110°, to 67

MPa wherein it is 135° as the deflection angle becomes larger. In such case having a large tensile vacuum stress, it is difficult to obtain a sufficient strength by thermal tempering. From this, it is understood that the present invention performs a large effect to reduce the weight of a glass funnel of flat type, in particular, a glass funnel of wide angle wherein the deflection angle is substantially 120° or more.

Even in a case of a cathode ray tube having a plurality of neck portions 5 and yoke portions 6 in which a plurality of electron guns and a plurality of deflection yoke coils are used as shown in FIG. 6, the degree of flatness of the funnel portion 2 can be obtained by the conversion of the positional relation between screen edges of the inner face of the face portion and the reference line of the yoke portion into a deflection angle of the cathode ray tube for scanning electron beams by a single deflection yoke coil, in the same manner. The deflection angle of substantially 120° or more means a deflection angle obtained by such conversion.

In the following, concrete explanation will be made as to the ion exchanging method by the electric field assisting method of the present invention.

The present invention is suitable for a glass funnel having a balanced amount of alkali oxide in order to obtain the above-mentioned mixed alkali effect, and for strengthening partly or selectively a local region having a high tensile vacuum stress of the glass funnel. Namely, the outer surface of the body portion of the glass funnel is not uniformly strengthened by ion exchanging method by the electric field assisting method, but a portion in the outer surface of the body portion where a large tensile vacuum stress is generated whereby fracture may cause, specifically, a region including a portion where the maximum tensile vacuum stress $\sigma_{VF}$ is generated, and if necessary, a region where a tensile vacuum stress having a predetermined magnitude whereby trouble of strength may cause, are partly strengthened by ion exchanging method.

Thus, in order to strengthen partly the region having a high tensile vacuum stress of the glass funnel by ion exchanging, the ion exchanging method using paste is preferable as described above. According to this method, an anode is formed in a region to be strengthened by ion exchanging method in the outer surface of the body portion of the glass funnel by using paste containing a salt which contains alkali ions whose ionic radius is larger than or equal to that of alkali ions in the glass, wherein the alkali ions in the glass are replaced with alkali ions in the paste, whereby only the region provided with the anode can be strengthened partly by ion exchanging method.

In the present invention, the paste can be obtained by adding clay and a solvent to the salt and mixing them. The viscosity of the paste is regulated by adjusting an amount of the solvent so that it is about 200 Pa·s in consideration of workability for coating, the prevention of oozing of the solvent and so on. As the salt, potassium nitrate, potassium carbide can be mentioned as typical salt. Generally, potassium nitrate is used. However, the present invention is not limited to this, and a plurality of salts may be used in combination. The above-mentioned clay serves to disperse and mix uniformly the salt and to make paste by the addition of the solvent. Kaolin or the like containing silicon dioxide as the main component can preferably be used.

Further, for the solvent, an organic solvent which disappears by decomposition or evaporates completely at a temperature lower than the melting point of the salt is most preferable. Since water used conventionally, when used to a glass surface having a three-dimensional structure such as the body portion of the glass funnel as described above, oozes and expands from a paste-applied portion, a region broader than the portion to which the paste is applied, is strengthened by ion exchanging method. The expansion of the water varies depending on the thickness of the paste, moisture, the shape of the glass surface such as concave and convex and a slope. Accordingly, it is difficult to make the area to be strengthened by ion exchanging method substantially constant.

On the other hand, use of the organic solvent is advantageous because the problem caused by using the water solvent can easily be eliminated. As the organic solvent, propylene glycol, ethylene glycol, glycerin or the like may be mentioned, and in particular, propylene glycol or ethylene glycol is preferable. The organic solvent to be chosen should be such one having a predetermined molecular weight to form liquid at room temperature.

The paste is applied partly as an anode in a region including at least a portion where the maximum tensile vacuum stress $\sigma_{VF}$ is generated, in an outer surface of the body portion of the glass funnel. In this case, the anode may be formed by applying the paste directly on the glass surface, or applying the paste previously on an electrode material, the electrode material being attached to the glass surface at a portion to be strengthened by ion exchanging method. In the case of using the glass funnel wherein the above-mentioned $\sigma_{VF}$ is generated in a portion in the vicinity of an opened end on a short axis in the outer surface of the body portion along its longer side, the anode is formed at least opposing portions at a longer side, of the outer surface of the body portion. As the case requires, it may be formed partly in a region where a tensile vacuum stress having a predetermined magnitude by which a trouble of strength may cause, is generated. As such region, for example, a central portion at a short side in the vicinity of the opened end of the outer surface of the body portion or a portion where a vacuum stress of 10 MPa or more is generated, may be mentioned.

The surface area of the anode to be formed is determined dominantly from the viewpoint how much a vacuum stress covers a region having 10 MPa or more. Of course, the anode may be formed in a broader region. However, it is unnecessary to strengthen by ion exchanging the portion because this portion is not required to have strength. Although the thickness of the anode is not limited, it is preferable to have a thickness of about 1 to 5 mm because an extremely thin thickness may cause difficulty of obtaining a predetermined uniform ion exchanging.

On the other hand, a cathode is formed at an inner side of the body portion of the glass funnel. Although the cathode may be formed by using the same paste as the anode in the same manner as above, it is unnecessary to use such technique. Further, the cathode may be formed in a single form wherein the cathode extends continuously as a common electrode to the inner side of the body portion, or may be in a separate form wherein the cathode is an independent electrode corresponding to each anode. However, the later form is suitable for controlling separately a voltage applied during ion exchanging.

The glass bulb has an extremely high electric resistance in comparison with an ordinary soda lime glass because of its required characteristics. For example, the specific resistance of glass used for the glass funnel is $3.16 \times 10^2$ Ω cm, whereas that of the soda lime glass is $3.16 \times 10^8$ Ω cm. In order to feed a current to the glass, a fairly high voltage is needed. However, the application of an extremely high voltage causes dielectric breakdown because the glass can not withstand such voltage. On the contrary, in a low voltage, an electric current value fed in the glass is small, and an assisting effect for alkali ion exchange can not sufficiently be obtained. Therefore, it is not industrially because the ion exchanging takes a very long time.

In order to carry out ion exchanging using an electric field assisting method efficiently in a short time without causing the dielectric breakdown of such glass having a large electric resistance, it is important to control properly so that an applicable voltage meets the thickness of the portion to be subjected to ion exchanging, of the glass. It is desirable to carry out it in a range of $5 \leq (V/\text{Log}_e\rho)/T \leq 15$ where V represents a voltage (V) to be applied through the glass, $\rho$ represents the specific resistance ($\Omega$ cm) at the strain point of the glass and T represents the minimum thickness (mm) of the glass in a region strengthened by ion exchanging method. In particular, a range of $7 \leq (V/\text{Log}_e\rho)/T \leq 11$ is further preferable. When an ion exchanging time is to be shortened, the applicable voltage V should be high and $(V/\text{Log}_e\rho)/T$ be large. However, if $(V/\text{Log}_e\rho)/T$ exceeds 15, there may cause dielectric breakdown in the glass. On the other hand, when the applicable voltage is made low, the treating time increases rapidly. In order to strengthen by ion exchanging in a short time as possible a glass funnel having a high electric resistance, it is desirable practically that $(V/\text{Log}_e\rho)/T$ is 5 or more.

Thus, in order to strengthen by ion exchanging actually a glass funnel provided with an anode and a cathode, the glass funnel is heated to, for example, about 450° C. In the course of heating, the solvent in the paste disappears by decomposition or evaporates completely. Then, when temperature reaches about 450° C., the salt, e.g., potassium nitrate contained in the electrode melts and attaches on the glass surface. In such state, a voltage of from about 200 to 500 V is applied across the anode and the cathode, and potassium ions of the molten potassium nitrate are doped into the glass funnel under the condition of voltage application whereby the potassium ions are replaced with alkali ions in the glass whose ionic radius is smaller than that of the potassium ions.

EXAMPLE 1

Figure 1:
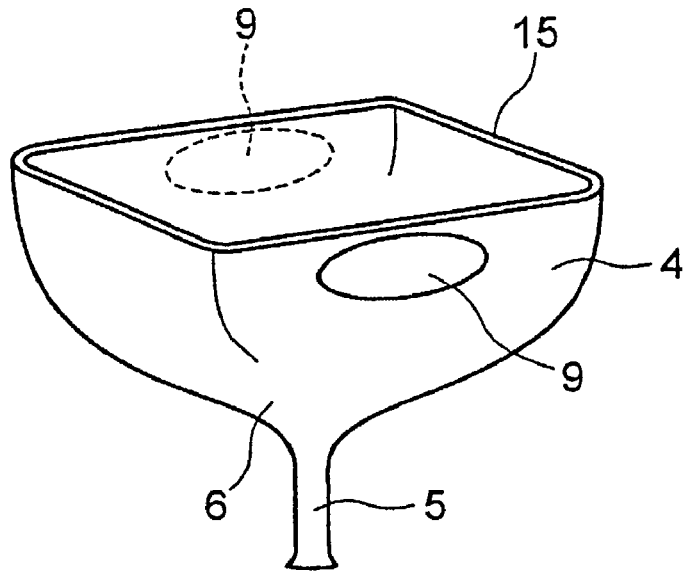
FIG. 1: Perspective view of the glass funnel according to an embodiment of the present invention.
Figure 2:
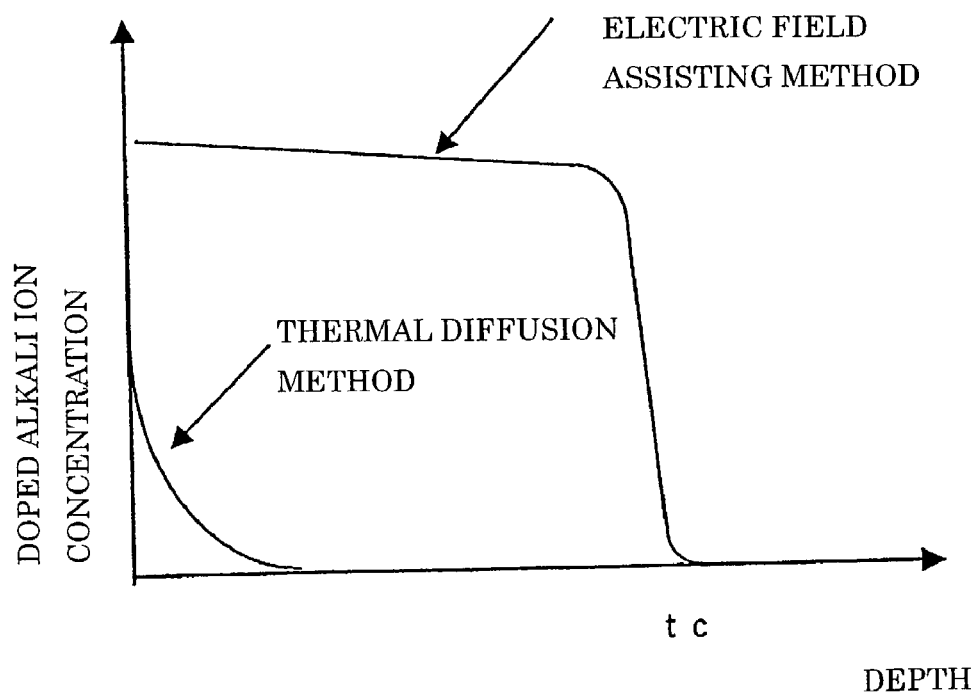
FIG. 2: Graph showing the relation between the depth of doped ions and the doped ion concentration by an electric field assisting method and a thermal diffusion method for ion exchanging.
Figure 3:
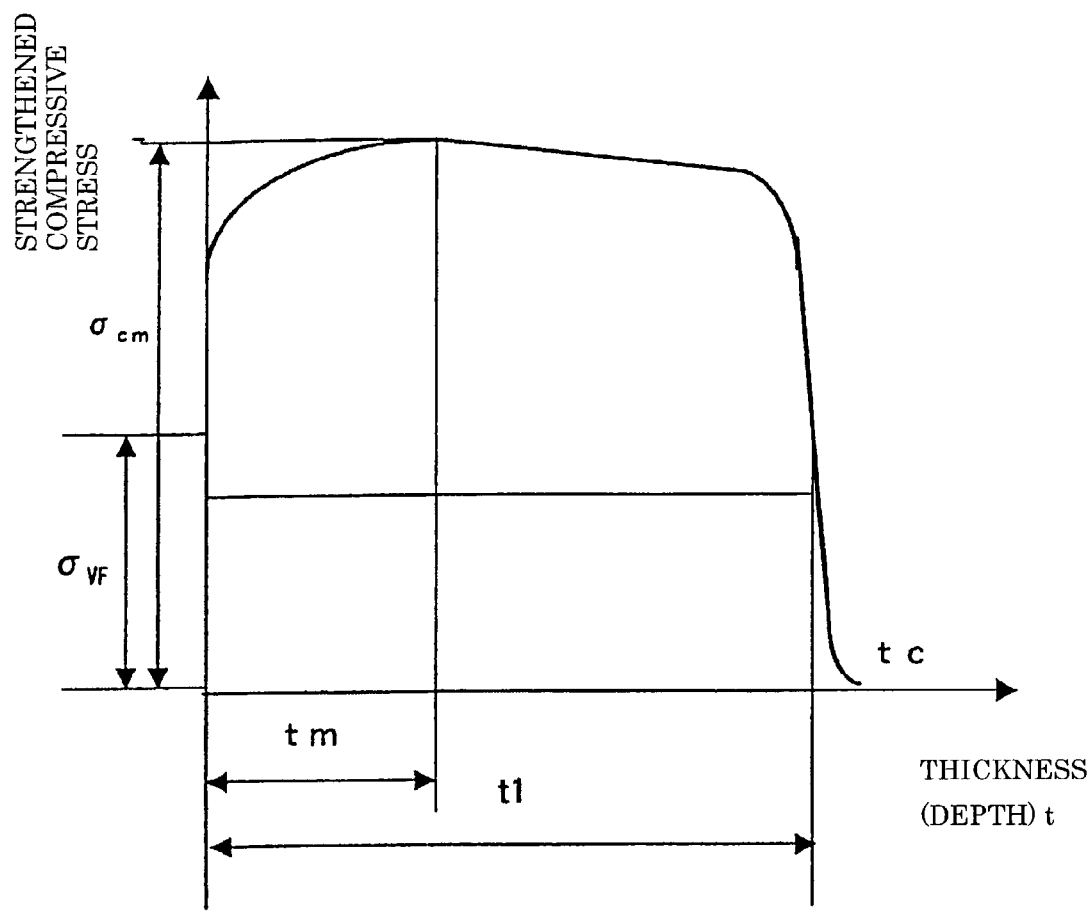
FIG. 3: Distribution diagram of the strengthened compressive stress by ion exchanging of the present invention in a case that a treating temperature is high.
Figure 4:
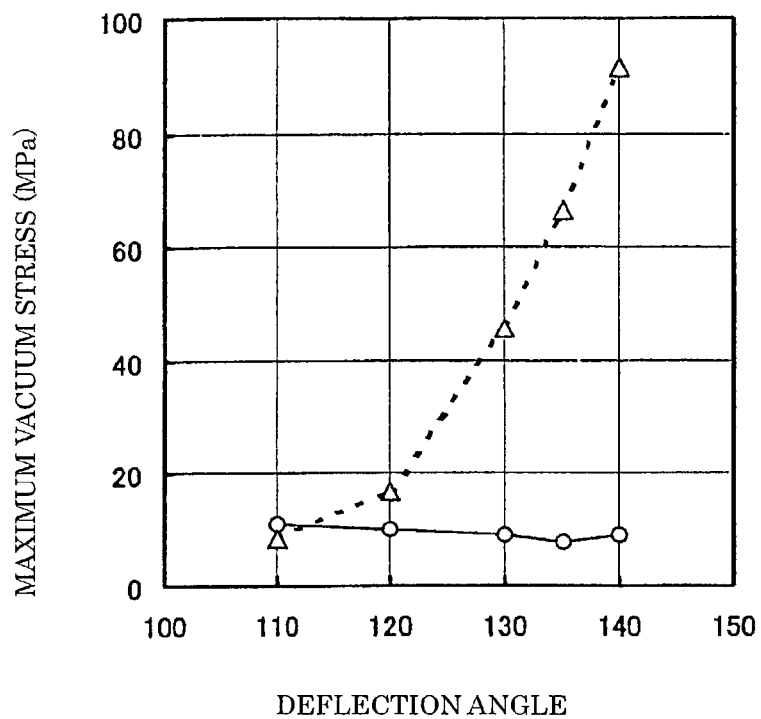
FIG. 4: Graph showing the relation between the deflection angle and the maximum tensile vacuum stress in a glass bulb for a cathode ray tube.
Figure 5:
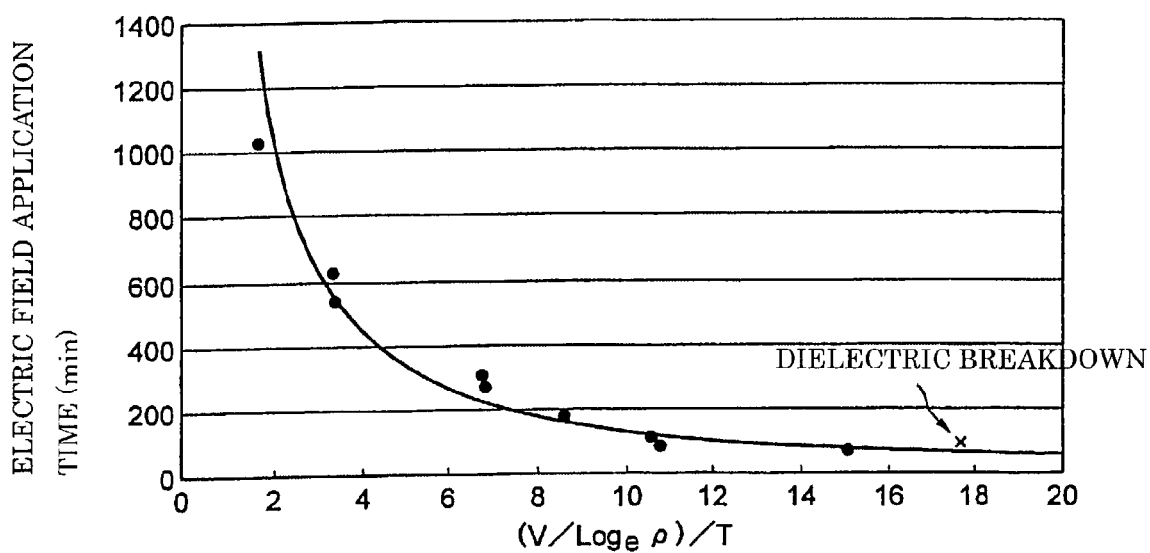
FIG. 5: Graph showing the relation between an electric current and an electric field application time in ion exchanging.
Figure 6:
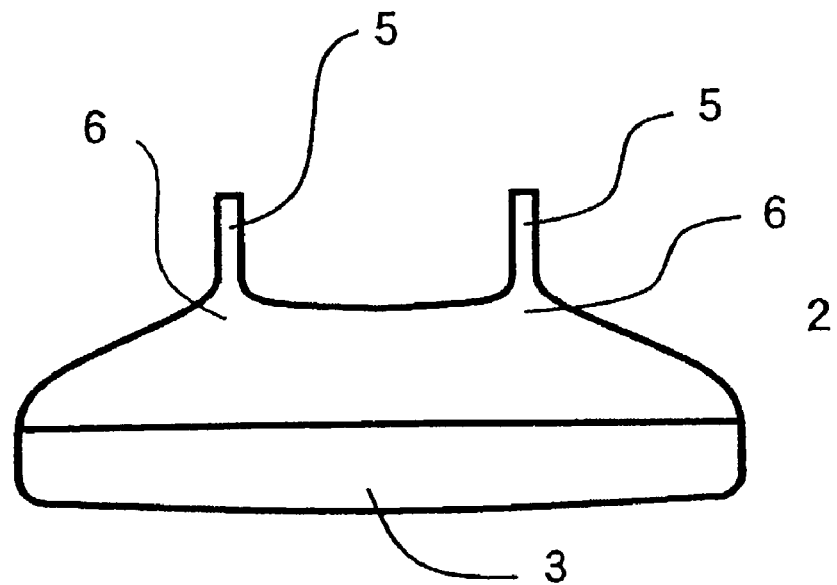
FIG. 6: Front view of the glass bulb for a cathode ray tube according to another embodiment of the present invention.
Figure 7:
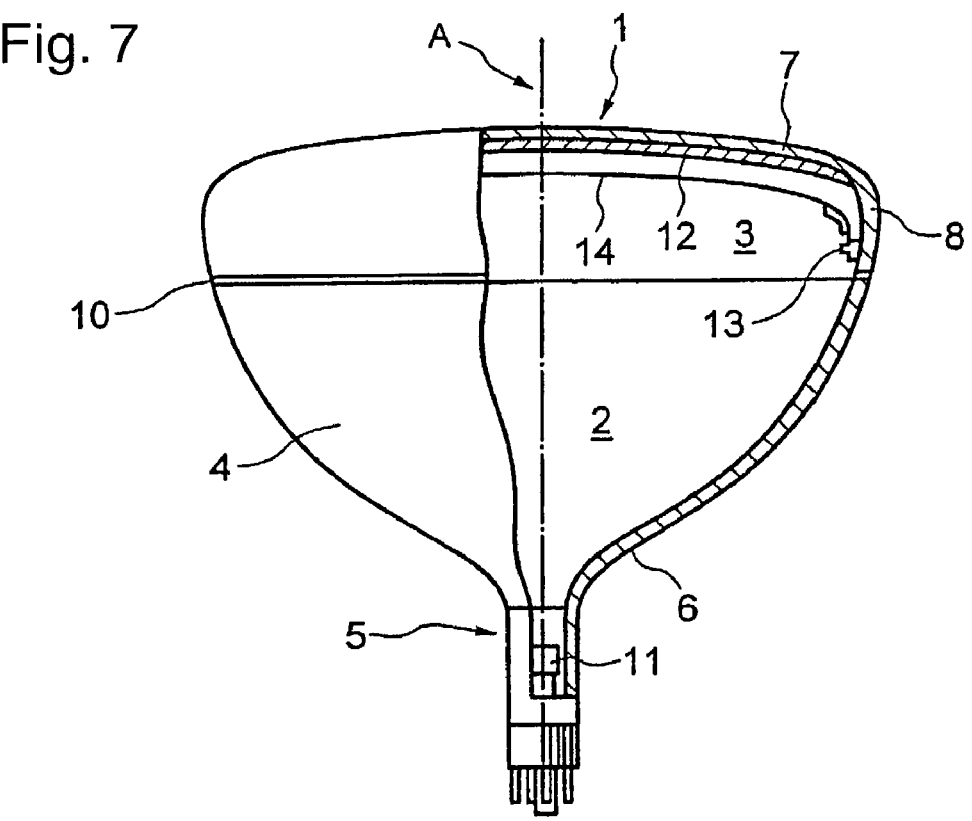
FIG. 7: Front view of a cathode ray tube with a part broken.
Figure 8:
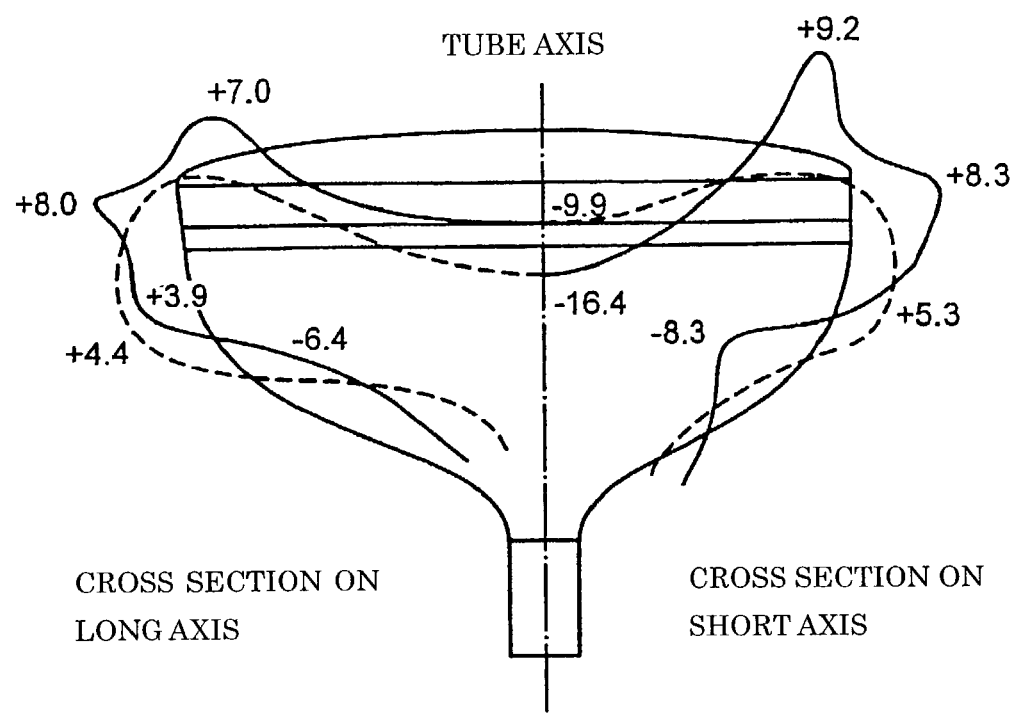
FIG. 8: Distribution diagram of vacuum stress of the glass bulb for a cathode ray tube.

With respect to ion exchanging of a glass by an electric field assisting method, experiments were conducted as to the relation between $(V/\text{Log}_e\rho)/T$ and a voltage application time in a case of obtaining a quantity of electricity of, for example, 9 coulomb/cm² per unit surface area wherein V represents a voltage (V) applied through the glass, $\rho$ represents the specific resistance value ($\Omega$ cm) at the strain point of the glass and T represents the minimum thickness (mm) of the glass in a region strengthened by ion exchanging method, to obtain a result as shown in FIG. 5.

When it is desirable to shorten the application time, $(V/\text{Log}_e\rho)/T$ should be made large as clear in FIG. 5. Namely, when the applicable voltage is made high, the treatment is conducted in a short time. However, it was found that there was substantially no effect by the shortening of time when $(V/\text{Log}_e\rho)/T$ was 15 or more, and there causes dielectric breakdown of the glass when the voltage was further increased. On the other hand, when the applicable voltage was lowered, the application time increased rapidly. Namely, when $(V/\text{Log}_e\rho)/T$ is less than 5, the application time increases with a high rate. Accordingly, it is desirable that $(V/\text{Log}_e\rho)/T$ is 5 or more.

In the experiments, the anode and cathode were formed by using paste containing $KNO_3$:kaolin:propylene glycol=6.5:3.5:3 by mass percentage, and they were fixed on both surfaces of a glass sample of 50 mm□×10 mm thick (the same as 0138 glass (tradename code) for a glass funnel manufactured by Asahi Glass Company, Limited).

EXAMPLE 2

With respect to an ion exchanging method using paste, suitable for ion exchanging by an electric field assisting method, experiments were conducted as to the difference between an organic solvent and a water solvent. The organic solvent was used in case 1 and case 2, and the water solvent was used in case 3. The glass used was the same as in Example 1. For the salt, potassium nitrate as reagent which was pulverized in a moltar to an average particle diameter of about 5 μm was used. For the clay, kaolin having an average particle diameter of 2 μm was used. In the mass ratio of potassium nitrate and kaolin, when the amount of the potassium nitrate is smaller, the molten potassium nitrate does not contact uniformly the glass surface. On the other hand, when more, it oozes from the paste in a molten state so that the surface area expands. Accordingly, as the optimum mass ratio, potassium nitrate:kaolin=65:35. The amount of the solvent was such one that the viscosity of the paste could be adjusted to about 200 Pa·s based on the mass ratio of potassium nitrate+kaolin. In case 1, propylene glycol (PG) in a liquid state at room temperature was used for the solvent, and in case 2, ethylene glycol (EG) in a liquid state at room temperature was used.

The condition for applying the electric field was the same in each case; a glass thickness of 10 mm, a temperature of 450° C., an applicable voltage of 300 V and a quantity of electricity of 9 coulomb/cm² (application time: about 90 min) were used, and the number of tests was 10 each.

For each sample having been subjected to ion exchanging, measurement was conducted as to the maximum value, average value, minimum value, maximum value minus minimum value (scattering) of the compressive stress value of the compressive stress layer obtained by ion exchanging, and the maximum value, average value, minimum value, maximum value minus minimum value (scattering) of the thickness of the compressive stress layer obtained by ion exchanging. The expansion of the paste was confirmed by eyes after the application of the electric field. Table 1 shows each result.

TABLE 1

|  | Case 1 | Case 2 | Case 3 |
| --- | --- | --- | --- |
| Kind of solvent | PG | EG | Water |
| Mass of solvent (mass %) | 3.5 | 3.5 | 5 |
| Compressive stress value: | | | |
| Average (MPa) | 330 | 335 | 320 |
| Maximum (MPa) | 350 | 346 | 347 |
| Minimum (MPa) | 297 | 280 | 288 |
| Scattering (MPa) | 53 | 54 | 59 |
| Thickness of compressive stress layer: | | | |
| Average (μm) | 85 | 83 | 61 |
| Maximum (μm) | 92 | 95 | 84 |
| Minimum (μm) | 81 | 83 | 55 |
| Scattering (μm) | 11 | 12 | 29 |
| Expansion of paste (by eyes) | None | None | Yes |

As is clear from the result, use of water as the solvent results that potassium nitrate oozes from the paste so that the surface area is indefinite even though the condition of applying the electric field is constant, and there causes a large scattering in the thickness of the compressive stress layer. On the other hand, in cases 1 and 2 wherein the organic solvent is used, there is no oozing of potassium nitrate when molten; the surface area is constant; the compressive stress layer can be formed deeper than that of case 1 using the water solvent, and the scattering of the compressive stress layer is small.

EXAMPLE 3

Evaluation of the applicability of three kinds of glass in Table 2 to the glass funnel was made. In Table 2, each glass composition is represented by molar percentage, and WK and WNa indicate respectively the molar percentage of $K_2O$ and $Na_2O$. Further, the specific electric resistance represents a value at the strain point. The proportion of the $K_2O$ content based on the total amount of $Na_2O$ and $K_2O$ of each glass (WK/(WNa+WK)) is as in Table 2. The specific electric resistance of each glass varies depending mainly on WK/(WNa+WK), and it decreases even when the proportion of the $K_2O$ content is smaller or larger than No. 2 glass as is clear from Table 2.

In the evaluation of the applicability of each kind of glass to the glass funnel, No. 1 glass in which WK/(WNa+WK) is smaller than 0.35 and No. 2 glass in which such value is larger than 0.6 showed a poor insulating property because of its having a small electric resistance. And, it was confirmed that when a cathode ray tube was assembled using such glass, and when a high voltage was applied thereto, there caused disorder of picture image due to electric conductance, and dielectric breakdown causes. On the other hand, No. 2 glass wherein WK/(WNa+WK) is in a range of from 0.35 to 0.6 has a large electric resistance, and therefore, such problem does not occur even when a high voltage is applied.

TABLE 2

| Kind of glass | No. 1 | No. 2 | No. 3 |
| --- | --- | --- | --- |
| $SiO_2$ | 65.2 | 66.6 | 67.0 |
| SrO | 0.7 | 0.4 | 0.4 |
| BaO | 0.2 | 0.5 | 0.0 |
| $Na_2O$ | 11.5 | 8.0 | 3.8 |
| $K_2O$ | 3.2 | 5.8 | 9.5 |
| $ZrO_2$ | 0.3 | 0.1 | 0.1 |
| PbO | 7.6 | 7.8 | 8.2 |
| $Al_2O_3$ | 3.0 | 2.2 | 3.0 |
| CaO | 5.4 | 4.7 | 4.1 |
| MgO | 2.8 | 3.8 | 3.8 |
| $Sb_2O_3$ | 0.1 | 0.1 | 0.1 |
| WK/(WNa + WK) | 0.22 | 0.42 | 0.71 |
| Specific electric resistance (Log value) | 10.2 | 12.5 | 10.5 |
| Applicability to glass funnel | X | ○ | X |

EXAMPLE 4

Experiments described in the following were conducted by using glass panels and glass funnels manufactured by Asahi Glass Company, Limited which were prepared by using glass having the characteristics shown in Table 3 (the glass was used for a body portion with respect to the glass funnel). Glass panels each having an aspect ratio of 16:9, an effective diagonal diameter of a face portion (screen) of 76 cm, an outer surface curvature of face portion of 10000 cm, a height of panel (a height from the sealing end to a central portion of outer surface of the face portion) of 12 cm, a wall thickness at a central portion of face of 2.0 cm and a wall thickness of sealing edge of 14.5 mm were used. Further, glass funnels each having a deflection angle of 120°, a diameter of neck portion of 29.1 mm, and a wall thickness at sealing edge to glass panel of 14.5 mm were used. The wall thickness (at a position 80 mm apart from the sealing edge) and the mass of the body portion are described with experimental result, in Table 4. No. 2 glass in Example 3 was used for the body portion.

For each glass funnel in cases 1 to 6, the portion where the maximum tensile vacuum stress $\sigma_{VF}$ was generated and the stress value at that portion were obtained, and it was confirmed that $\sigma_{VF}$ was generated in a portion near the sealing edge of an outer surface of the body portion at the central portion along a longer side of the body portion. An anode was formed by using the paste at that portion of each glass funnel except for cases 4 to 6, and a cathode was formed by using the same paste in an inner side of the glass funnel at the reverse side with respect to the anode. The paste used was the same as that used for case 1 in Example 2.

Then, the glass funnels of cases 1 to 3 were strengthened by ion exchanging method according to the electric field assisting method and the glass funnel of case 4 was strengthened by ion exchanging method according to the dipping method respectively. In Table 4, the methods used are distinguished by "electric field" and "immersion" respectively. Ion exchanging were not conducted in cases 5 and 6. Glass bulbs were prepared by attaching and sealing the glass funnels of these cases to the glass panels which were thermally tempered. On each glass bulb, a flaw was formed with a #150 emery sheet in the region where $\sigma_{VF}$ was generated in the outer surface of the body portion of each glass funnel, and a pressure test (a hydraulic pressure test) was conducted. This pressure test is a test according to such method that a glass bulb is put in a large hydraulic pressure tank, and a pressure is applied from the outside while the inside of the glass bulb is maintained at an atmospheric pressure. The pressure causing the fracture of the bulb was determined to be a withstanding pressure. Further, an explosion-proof test was conducted to each glass bulb of the above-mentioned cases, and confirmation was made about explosion-proof characteristics.

After the experiments, measurement was made to the compressive stress value $\sigma_{cm}$ of the compressive stress layer and the distribution of stress of the portion strengthened by ion exchanging method of each glass funnel in cases 1 to 4. The measurement of the stress value was conducted as follows. A glass sample was cut from the portion strengthened by ion exchanging method of each glass funnel; the sample was cut in perpendicular to the surface of the portion strengthened by ion exchanging method; the sample was polished to have a thickness of 0.5 mm or less; it was dipped in liquid having a refractive index near that of the glass, and it was observed with a polarization microscope from a direction of cut surface. In this case, a photo-elastic constant of 2.40 was used; and the stress value was obtained by fitting a rotary Berec compensator to a polarization microscope and calculating a value obtained by measuring the difference of light path in the stress layer with the photo-elastic constant. Further, the depth of the stress layer was obtained by observing a sensitive tint plate attached to the polarization microscope. Since there appears a change of brightness and color in the stress layer, the distance in its thickness direction is measured.

Further, it was confirmed by the measurements that the distribution of stress in the compressive stress layer of the glass funnel of each of the cases 1 to 3, which were strengthened by ion exchanging method according to the electric field assisting method is all according to a substantially step function, and the distribution of stress of the glass funnel of case 4 which was strengthened by ion exchanging method according to the dipping method was according to an expornential function. A result of measurement is described in Table 4 together with a result of the pressure test.

TABLE 3

|  | Panel portion | Funnel portion |
|---|---|---|
| Density (g/cm³) | 2.79 | 3.00 |
| Young's modulus (GPa) | 74 | 68 |
| Poisson's ratio | 0.21 | 0.21 |
| Softening point (° C.) | 703 | 663 |
| Annealing point (° C.) | 521 | 491 |
| Strain point (° C.) | 477 | 453 |

TABLE 4

|  | Case 1 | Case 2 | Case 3 | Case 4 | Case 5 | Case 6 |
|---|---|---|---|---|---|---|
| Wall thickness of body portion (mm) | 6.5 | 6.0 | 12.5 | 6.5 | 6.5 | 13.5 |
| Mass (kg) | 14 | 13 | 20 | 14 | 14 | 22 |
| $\sigma_{VF}$ (MPa) | 30 | 40 | 10 | 30 | 30 | 7 |
| Strengthening by ion exchanging | Electric field | Electric field | Electric field | Dipping | None | None |
| Thickness of compressive stress layer $t_1$ (μm) | 140 | 80 | 180 | 40 | — | — |
| Strengthened effective thickness (μm) | 140 | 80 | 180 | 10 | — | — |
| $\sigma_{cm}$ (MPa) | 100 | 100 | 320 | 100 | — | — |
| $|\sigma_{VF}/\sigma_{cm}|$ | 0.3 | 0.4 | 0.03 | 0.3 | — | — |

TABLE 4-continued

|  | Case 1 | Case 2 | Case 3 | Case 4 | Case 5 | Case 6 |
|---|---|---|---|---|---|---|
| Withstanding pressure (MPa) | 0.28 | 0.27 | 0.32 | 0.12 | 0.07 | 0.28 |
| Starting point of breakage | End of sealing portion | End of sealing portion | End of sealing portion | Body portion | Body portion | Body portion |

Cases 1 to 3 in Table 4 are Examples and cases 4 to 6 are Comparative Examples. As is understood from Table 4, the glass funnels of cases 1 to 3 has a compressive stress layer of at least 60 μm thick. Further, since the compressive stress was distributed according to a substantially step function, the effective thickness of the compressive stress layer does not substantially change even in the application of a vacuum stress which would be applied to a cathode ray tube. Accordingly, they had the withstanding pressure sufficient for practical use (0.25 MPa or more), and there was found that the starting point of breakage was at an end of the sealing portion of the glass funnel, and no breakage occurred in the portion strengthened by ion exchanging method. From this fact, it was confirmed that the strength of the portion where the maximum tensile stress $\sigma_{VF}$ was generated, which was the weakest point of the glass funnel, could be improved remarkably by ion exchanging. Further, the explosion-proof characteristics were good for all.

For case 4, ion exchanging by the dipping method was conducted. The thickness of the compressive stress layer was not so increased. Further, since the distribution of stress was not according to a substantially step function, the effective thickness of the compressive stress layer upon the application of an external force was about 10 μm (calculated from the magnitude of the external force and the distribution of stress according to an exponential function), and therefore, the glass funnel was extremely weak to the flaw whereby a high withstanding pressure could not be obtained.

For case 5, since the glass funnel of relatively light weight which was the same as case 1, was not strengthened by ion exchanging method, the withstanding pressure was extremely low, and the breakage occurred at 0.07 MPa from the portion where the maximum tensile stress $\sigma_{VF}$ was generated, of the body portion. In case 6, the wall thickness of the glass funnel was increased so that $\sigma_{VF}$ was suppressed to 10 MPa or less. Accordingly, the body portion had a sufficient strength. However, the weight was, in turn, 22 kg, which was contrary to the requirement of weight reduction. The explosion-proof characteristics of cases 4 to 6 were good.

INDUSTRIAL APPLICABILITY

In the present invention as described above, the compressive stress layer is formed partly in a region in an outer surface of the body portion of the glass funnel, the region having a problem of strength because a large tensile vacuum stress is generated, by doping alkali ions having a larger ionic radius in order to perform ion exchanging. And, since the concentration of doped alkali ions in the compressive stress layer in a direction of the thickness of the glass is distributed according to a substantially step function, the compressive stress layer can keep continuously an effective thickness even when a large tensile vacuum stress is generated when the glass is assembled into a cathode ray tube. Further, by specifying the relation between the maximum tensile vacuum stress generated in the body portion and the maximum value of compressive stress in the compressive stress layer, a glass funnel for a cathode ray tube of light weight, safety and highly reliability is obtained.

Further, the ion exchanging can be conducted by the electric field assisting method and the ion exchanging method using paste in combination, whereby the concentration of doped alkali ions can be distributed according to a substantially step function. Further, since paste is formed by using an organic solvent, the scattering in the stress value and thickness of the compressive stress layer are made small and the thickness of the compressive stress layer is further increased. Accordingly, the outer surface of the body portion of the glass funnel having a complicated configuration is desirably strengthened by ion exchanging method.

In addition, the ion exchanging method using paste facilitates strengthening efficiently to a portion for which an increase of strength to an external force or a flaw is required, of the glass funnel having a large sized and three-dimensional construction. Therefore, it is unnecessary to use a large-sized tank as required for the conventional dipping method, whereby manufacturing cost is reduced.

The entire disclosure of Japanese Patent Application No. 2002-13025 filed on Jan. 22, 2002 including specification, claims, drawings and summary are incorporated herein by reference in its entirety.

What is claimed is:

1. A glass bulb for a cathode ray tube comprising:
   a panel portion with a substantially rectangular face portion; and
   a funnel portion including a body portion with an opened end connected to the panel portion, wherein:
   glass constituting the funnel portion contains at least 60% of $SiO_2$ and at least 7% of PbO by molar percentage and satisfies $0.35 \leq WK/(WNa+WK) \leq 0.6$ where WNa and WK indicate respectively a molar percentage of $Na_2O$ and $K_2O$ included therein;
   the glass bulb, when assembled in a cathode ray tube, has a region which generates a tensile vacuum stress by the application of an atmospheric pressure to an outer surface of the glass bulb inside of which is vacuumed, and a compressive stress layer is formed partly by ion exchanging in an at least a region in the funnel portion, which includes a portion in an outer surface of the body portion of the funnel portion, in which $\sigma_{VF}$(MPa) is generated, where $\sigma_{VF}$(MPa) is the maximum value of the tensile vacuum stress, and
   the concentration of potassium ions is distributed according to a substantially step function in a thickness direction of the glass in the compressive stress layer, and when the maximum value of a compressive stress in the compressive stress layer is a $\sigma cm$(MPa), the relation between $\sigma_{cm}$ and $\sigma_{VF}$ is $0.03 \leq |\sigma_{VF}/\sigma_{cm}| \leq 0.5$.

2. The glass bulb for a cathode ray tube according to claim 1, wherein $\sigma_{cm}$ is 8 to 40 MPa and $\sigma_{cm}$ is 80 to 350 MPa.

3. The glass bulb for a cathode ray tube according to claim 1, wherein $\sigma_{cm}$ is generated in the surface or inside of the compressive stress layer in a direction of the thickness of the glass, and $t_1$ is in a range of from 60 to 200 μm where $t_1$ represents a depth which is inside of the portion generating $\sigma_{cm}$ and at which the magnitude of the compressive stress is equal to $\sigma_{VF}$.

4. The glass bulb for a cathode ray tube according to claim 1, wherein the tensile vacuum stress generated in an outer surface of the body portion at the side adjacent to a side where $\sigma_{VF}$ is generated, is 10 MPa or less.

5. The glass bulb for a cathode ray tube according to claim 1, wherein the region in which the compressive stress layer is partly formed by ion exchanging is in an outer surface of the body portion at a side where $\sigma_{VF}$ is generated, and which has a tensile vacuum stress of at least 10 MPa.

6. The glass bulb for a cathode ray tube according to claim 1, wherein a region generating a tensile vacuum stress of at least 10 MPa is formed in an outer surface of the body portion at the side adjacent to a side where $\sigma_{VF}$ is generated, and the outer surface of the body portion including at least that region is partly strengthened by ion exchanging method.

7. The glass bulb for a cathode ray tube according to claim 1, wherein the deflection angle of electron beam is substantially 120° or more.

8. A cathode ray tube prepared by using the glass bulb for a cathode ray tube according to claim 1.

9. A cathode ray tube described in claim 8, wherein the panel portion is a thermally tempered glass panel.

10. A glass bulb for a cathode ray tube according to claim 1, wherein glass constituting the funnel portion contains over 65.2% of $SiO_2$ by molar percentage.

11. A glass bulb for a cathode ray tube according to claim 1, wherein glass constituting the funnel portion contains between 65.2% and 67% of $SiO_2$ by molar percentage.

* * * * *